United States Patent [19]

Nelson

[11] Patent Number: 5,021,696
[45] Date of Patent: Jun. 4, 1991

[54] COOLING FAN WITH REDUCED NOISE FOR VARIABLE SPEED MACHINERY

[75] Inventor: David A. Nelson, Union Lake, Mich.

[73] Assignee: Ford Motor Company, Dearborn, Mich.

[21] Appl. No.: 408,154

[22] Filed: Sep. 14, 1989

[51] Int. Cl.$^5$ .............................................. H02K 9/06
[52] U.S. Cl. ......................................... 310/62; 310/63; 310/258; 310/263
[58] Field of Search .................. 310/68 D, 51, 59, 62, 310/63, 258, 263, 89; 415/119; 416/93 R, 185, 178, 187, 223 R, 223 B, 228, 237, DIG. 3; 29/156.8 R, 156.8 CF

[56] References Cited

U.S. PATENT DOCUMENTS

| | | |
|---|---|---|
| 2,508,144 | 5/1950 | Carville . |
| 2,731,193 | 1/1956 | Lall et al. . |
| 3,090,543 | 5/1963 | Busquet . |
| 4,115,030 | 9/1978 | Inagaki et al. . |
| 4,162,419 | 7/1979 | DeAngelis . |
| 4,184,804 | 1/1980 | Inagaki .......................... 416/223 B |
| 4,492,885 | 1/1985 | Kitamura ......................... 310/68 D |
| 4,565,936 | 1/1986 | Ikegami ............................ 310/63 |
| 4,666,373 | 5/1987 | Sugiura . |
| 4,684,324 | 8/1987 | Perosino . |
| 4,757,221 | 7/1988 | Kurihashi ........................... 310/62 |
| 4,838,760 | 6/1989 | Brackett . |

FOREIGN PATENT DOCUMENTS

| | | |
|---|---|---|
| 0300063 | 1/1989 | European Pat. Off. .............. 310/62 |
| 2617029 | 4/1976 | Fed. Rep. of Germany . |
| 2819978 | 11/1979 | Fed. Rep. of Germany ........ 310/63 |
| 3035761 | 5/1982 | Fed. Rep. of Germany . |
| 2256684 | 7/1975 | France . |
| 63-41817 | 11/1988 | Japan . |
| 534586 | 12/1976 | U.S.S.R. . |

OTHER PUBLICATIONS

Raj et al., *Noise Generation in FC Centrifigual Fan Rotors*, Fluid Transients and Acoustics in the Power Industry, ASME Annual Winter Meeting, San Francisco, Calif. (1978), pp. 289-300.
Raj et al., *Measurements of the Mean Flow Velocity and Velocity Fluctuations at the Exit of an FC Centrifugal Fan Rotor*, Journal of Engineering for Power, Transactions of ASME, vol. 103, (Apr. 1981), pp. 393-399.
Neise, *Noise Reduction in Centrifugal Fans*, J. of Sound and Vibration, vol. 45 (1976), pp. 375-403.
Smith et al., *Reducing Blade Passage Noise in Centrifugal Fans*, ASHRAE Trans., vol. 80 (1974), pp. 45-52.
Cau et al., *Measurements of Primary and Secondary Flows in an Industrial Forward-Curved Centrifugal Fan*, J. of Engineering for Power, Trans of ASME, vol. 109 (Dec. 1987), pp. 353-358.

Primary Examiner—R. Skudy
Attorney, Agent, or Firm—Mark Mollon; Paul K. Godwin

[57] ABSTRACT

A centrifugal fan for ventilated rotating machinery is provided having tapered fan blades to reduce sound pressure levels generated by fan operation over a wide speed range. The tapering of the fan blades keeps the cross-sectional area of each flow channel substantially constant as the air flows radially through the fan, resulting in a less turbulent flow. Each fan blade may include a height profile having a tapered segment in which blade height decreases in proportion to increasing radial distance from the central axis of the fan.

6 Claims, 4 Drawing Sheets

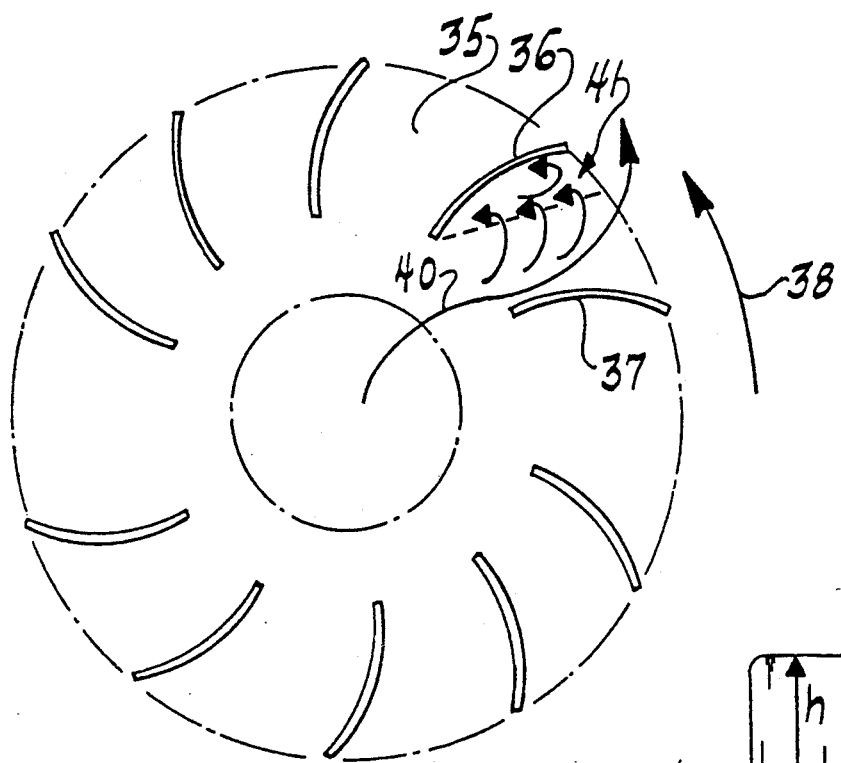
Fig. 2a (PRIOR ART)
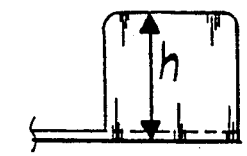
Fig. 2b (PRIOR ART)
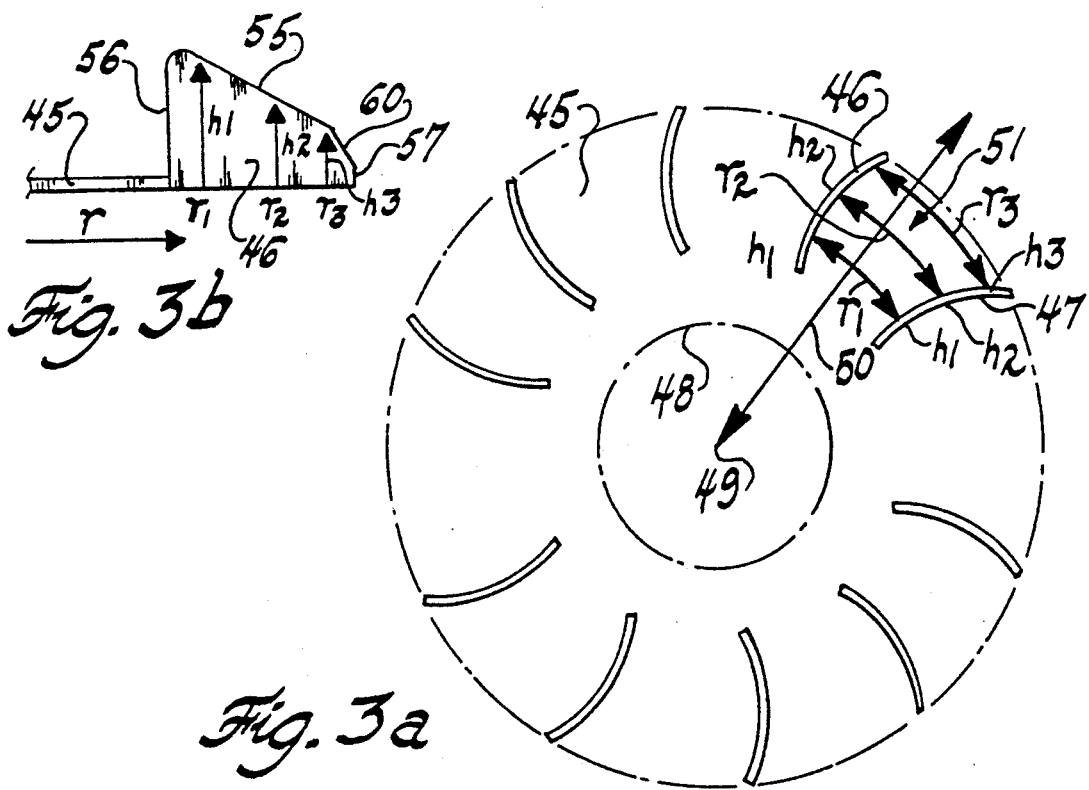
Fig. 3b
Fig. 3a

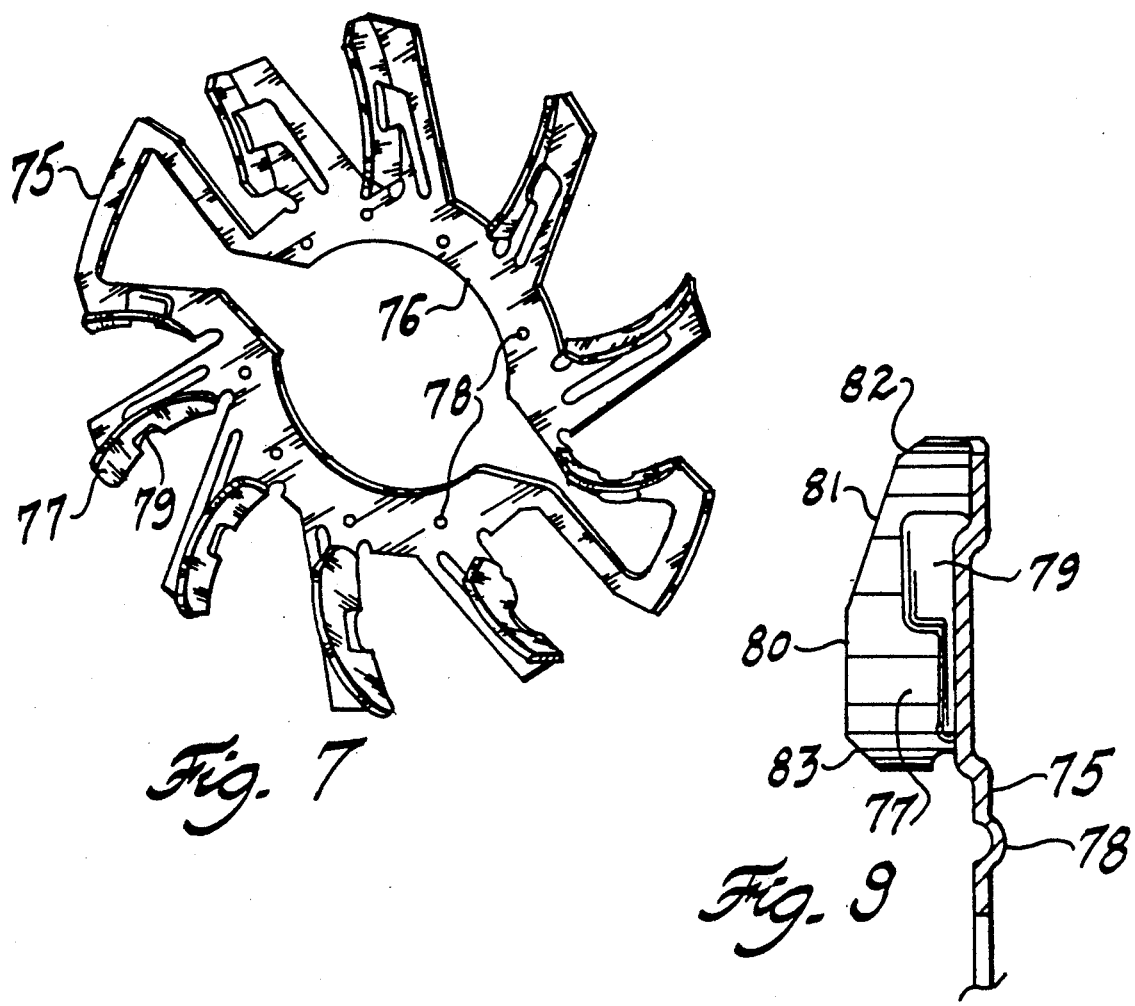
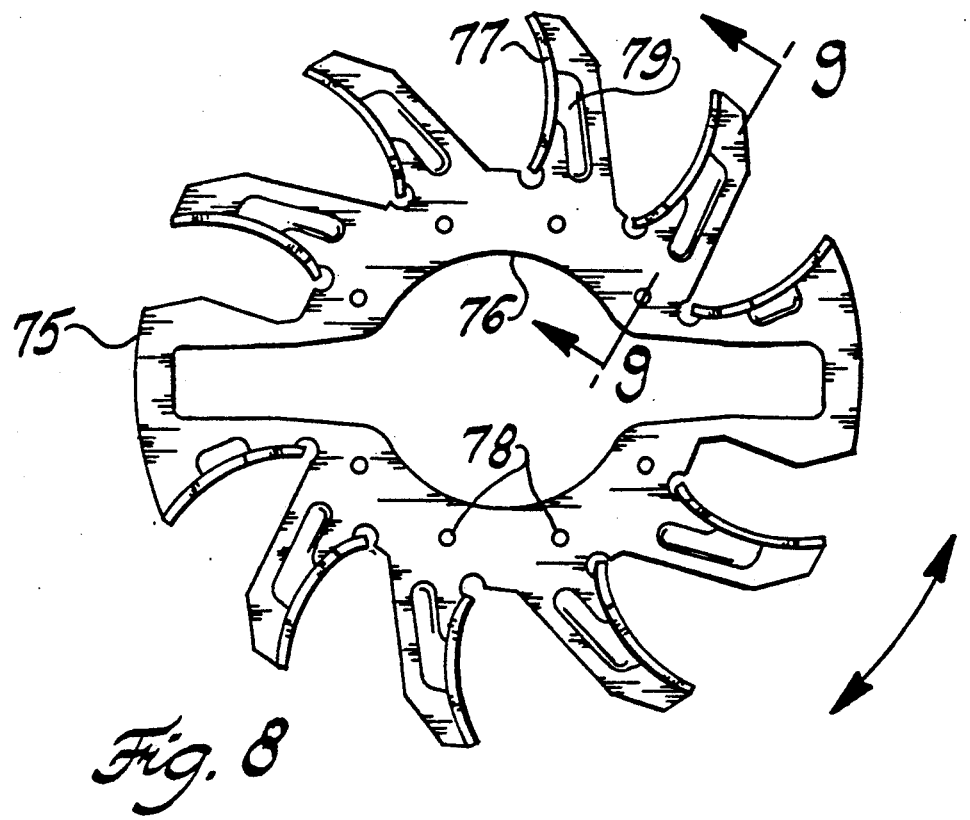

COOLING FAN WITH REDUCED NOISE FOR VARIABLE SPEED MACHINERY

BACKGROUND OF THE INVENTION

The present invention relates in general to a cooling fan for rotating electrical machinery such as motors and alternators, and more specifically to fan blade structures which result in reduced fan noise.

Dynamoelectric machines, such as generators, alternators, and motors, are types of rotating machinery which convert mechanical energy into electrical energy and vice versa. Such machines include a stator and a rotor. The rotor is coupled to a shaft for rotation adjacent the stator. Either the rotor or stator, or both, include windings which conduct current and thus produce heat. Other electrical components such as rectifier diodes and mechanical components such as bearings also produce heat and are often located inside the housing of the rotating machine.

In order to provide cooling of such machines, the housing is typically ventilated to allow airflow through the machine. In addition, fans may be included on the rotor or the shaft for drawing air through the housing.

An automotive alternator is known having a structure wherein a fan is attached to each end of the rotor interior of the housing. A front fan draws air in through the front end of the housing and out through the side of the housing. A rear fan draws air through the rear end of the housing and out through the side of the housing. Thus, cooling airflow can be directed to all interior parts, including electrical components, bearings, and windings.

The main disadvantage connected with the use of cooling fans is the noise generated. Since most fans, such as air conditioning fans and automobile alternators, are operated in the vicinity of people, it is desirable to minimize noise generation. Prior art attempts to solve the noise problem have failed to achieve sufficiently reduced noise with a structure which is suitable for inexpensive, large volume production. Prior art solutions typically assume a constant fan speed. That is not a valid assumption for an automobile alternator, which is required to operate over a wide speed range.

U.S. Pat. No. 4,162,419 granted to DeAngelis, discloses an automotive alternator having airflow through the alternator as a result of an internal fan rotating within the housing. Such airflow is directed over semiconductor elements within the alternator. An exterior fan is also provided on the opposite end of the alternator. The fans described in this patent provide efficient cooling of all components, but it would be desirable to decrease the noise levels produced.

U.S. Pat. No. 4,684,324, issued to Perosino, teaches a radiator fan for motor vehicles with a central hub and an outer ring which are joined by curved blades. In an attempt to provide quiet operation of the fan, a particular curvature is provided for the fan blades as viewed in the axial direction. Manipulating the blade curvature has made some beneficial impact on noise generation.

German Offenlegungsschrift 2617029 discloses a fan intended for the electrical generator of an internal combustion engine. The fan is made from a stamped metal plate such that axially projecting fan blades are produced. In addition to curved blades defining a curved flow path, the blades are given no sharp edges so as to achieve some improvement in noise performance.

In the publications Raj et al. (I), *Noise Generation In FC Centrifigual Fan Rotors*, Fluid Transients and Acoustics in the Power Industry, ASME Annual Winter Meeting, San Francisco, Calif. (1978), pages 289—300, and Raj et al. (II), *Measurements of the Mean Flow Velocity and Velocity Fluctuations at the Exit of an FC Centrifugal Fan Rotor*, Journal of Engineering for Power, Transactions of ASME, Vol. 103 (April 1981), pages 393-399, flow separation in the air flow through the fan is identified as the major source of noise. These publications propose a two-dimensional aerofoil blade shape with a convergent blade passage to reduce the flow separation and thus reduce noise. Such blade shapes cannot be produced by simple manufacturing techniques such as stamping of sheet metal parts. Furthermore, thickening of the blades undesirably adds mass to the fan which reduces the efficiency of the machine and raises the requirements for mechanical strength of the fan.

SUMMARY OF THE INVENTION

It is a principal object of the present invention to provide a fan for rotating electrical machinery which is not subject to the foregoing disadvantages.

It is a further object of the present invention to provide fan cooled rotating electrical machinery which operates quietly and with a large cooling fluid flow.

It is another object of the present invention to provide a method for reducing noise generated by a variable speed rotating centrifugal fan rotor.

It is still another object to provide a fan plate and fan blade structure which operates with reduced noise but is manufacturable by simple and inexpensive techniques.

These and other objects are achieved by a fan comprising a support plate and a plurality of blades. The support plate is adapted to be coupled to a shaft of a rotating electrical machine and rotates about a central axis. The plurality of blades are supported by the supporting plate to extend substantially normal thereto and have substantially constant thickness. Each blade extends radially from the central axis and a flow channel is defined between each adjacent blade. At least a portion of each blade has a height profile with respect to the supporting plate which is tapered to reduce flow separation of fluid passing through the flow channels. The reduction of flow separation is obtained over a range of rotational speeds of the fan because of the substantially constant cross-sectional area of the flow channels resulting from the tapered profile. More specifically, each blade has a height profile which is a function of radial distance from the central axis. The height profile preferably includes a tapered segment in which the height profile is substantially inversely proportional to radial distance from the fan center in order to maintain a corresponding portion of the defined channel at a constant cross-sectional area.

The invention further includes a method for reducing noise generated by a variable speed rotating centrifugal fan and rotor. A plurality of fan blades are provided for defining a plurality of flow channels and for creating a pressure difference during rotation to cause a fluid flow. The blades are provided with a tapered portion in which blade height decreases in proportion to increasing radius from the fan center. This relationship reduces the size of regions in the flow channels with a positive derivative of pressure with respect to radial distance from the central axis.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 2A is a top view of a centrifugal fan showing a condition resulting in excessive noise.

FIG. 2B is a side view of a prior art fan blade having a constant height.

FIG. 3A is a top view of a fan improvement according to the present invention.

FIG. 3B is a side view of a fan blade height profile according to the improvement of FIG. 3A.

FIG. 7 is a perspective view of another embodiment of the fan of the invention.

FIG. 8 is a top view of the fan of FIG. 7.

FIG. 9 is a side view of a fan blade as indicated in FIG. 8.

DETAILED DESCRIPTION OF PREFERRED EMBODIMENTS

Figure 1:
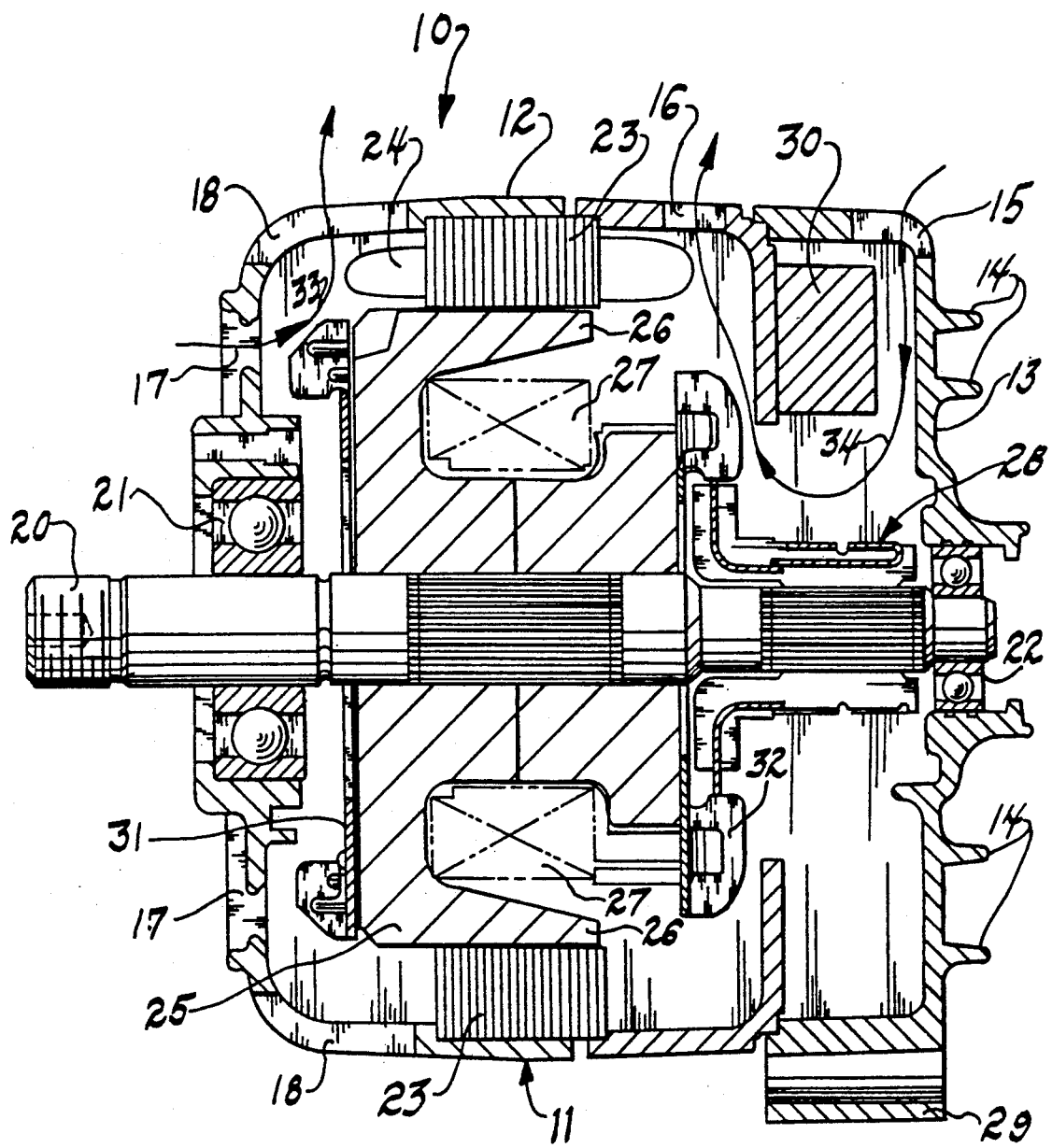
FIG. 1 is a cross-sectional view of an alternator according to the present invention.

Turning now to FIG. 1, an alternator 10 illustrates one preferred use of the fan of the invention. A housing 11 includes a front casting 12 and a rear casting 13. Each casting preferably includes cooling fins such as fins 14 on rear casting 13 to provide conductive cooling. The castings further include a plurality of air passages 15, 16, 17, and 18 to allow convective cooling of the machine.

A stator member 23 is supported in housing 11 and is wound with armature coils such as coil 24. Stator member 23 can, for example, support three armature coils to provide three-phase voltage generation.

A shaft 20 is supported in housing 11 by a front bearing 21 and a rear bearing 22. Shaft 20 extends through front casting 12 to receive pulley apparatus (not shown) for driving rotation of shaft 20 from a source of power such as an internal combustion engine (not shown). A through-bolt boss 29 may receive a bolt in order to secure alternator 10 together.

A rotor member 25 is secured to shaft 20 and includes pole pieces 26. Rotor member 25 rotates adjacent to the stationary stator member 23. A rotor winding 27 is secured to rotor member 25 and receives a DC excitation current through a brush assembly 28.

Stator coils 24 are connected to rectifying electronics (not shown) such as diodes for converting the generated AC voltage to a DC voltage. The electronics are secured to a heat sink 30 within housing 11 to receive a cooling air flow.

A front fan 31 and a rear fan 32 located within the housing are also secured to rotor member 25, as by projection welds (not shown) made using a well known resistance-welding process. In the presently described embodiment, front fan 31 includes backward bending blades (with respect to the direction of rotation—see FIGS. 4–6) and rear fan 32 includes forward bending blades (see FIGS. 7–9) such that rotation of the fans draws air in through the ends of the housing and out the sides of the housing, for example, along paths 33 and 34, respectively, The rotating fan blades create a static pressure which drops with increasing radial distance from the center of rotation. The dropping static pressure causes a dynamic air flow along the negative pressure gradient.

A major contribution to noise generation in prior art fan configurations arises from flow separation within the channels between adjacent blades. With reference to FIGS. 2A and 2B, a prior art centrifugal fan 35 is shown which supports a plurality of fan blades each having a constant height h. Blades 36 and 37 define a channel between the concave surface of blade 36 and the convex surface of blade 37. Upon rotation of fan 35, e.g., in the direction indicated by arrow 38, an air flow is created in the channel along a path 40. Due to the parameters of the flow channels in the prior art fan, a region 41 of flow separation develops adjacent the concave surface of blade 36. For rotation in the direction opposite arrow 38, flow separation region 41 would develop adjacent the convex surface of blade 37 and air flow would be radially inward (i.e., opposite to the direction of path 40). Region 41 has a pressure gradient such that the derivative of pressure with respect to radial position is positive, i.e., pressure increases with increasing distance from the center of rotation. An air flow results in region 41 which is in a direction opposite to the primary flow direction. This results in a circulating air flow having high turbulence and creating excessive noise.

FIGS. 3A and 3B illustrate an improved fan blade of the present invention which reduces flow separation and the resultant noise. A support plate 45 has an aperture 48 for receiving a shaft along a defined central axis 49. A plurality of fan blades including blades 46 and 47 are supported by support plate 45. The fan blades all have substantially constant and equal thicknesses to facilitate the manufacture of the fan by a stamping process. Each of the fan blades in FIG. 3A has a substantially identical arcuate shape and define flow channels, e.g., channel 51, between adjacent blades discharging within the housing. Upon rotation of the fan, an air flow develops between blades 46 and 47 which has a flow direction shown by arrow 50 either radially inward or radially outward depending on the direction of fan rotation. The present invention provides improved noise performance independently of the direction of fan rotation.

Figure 6:
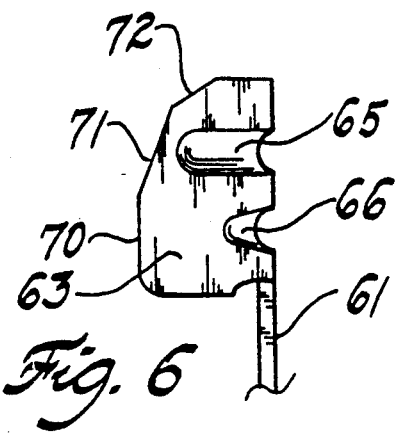
FIG. 6 is a side view of a fan blade as indicated in FIG. 5.

According to the present invention, each flow channel 51 maintains a substantially constant cross-sectional area measured at each radial position $r_1$, $r_2$, $r_3$, etc. by virtue of fan blades 46 and 47 having a predetermined height profile with respect to support plate 45, as shown in FIG. 3B. In general, the fan blade is tapered to reduce flow separation of fluid passing through its flow channel. This reduction is accomplished over a range of rotational speeds of the fan because of the constant cross-sectional area of channel 51. In this example, a taper portion 55 extends from a radially inner end 56 of blade 46 to a radially outer end 57. The tapered portion 55 can include substantially all of the radial extent of blade 46 as is shown in FIG. 3B, or can be employed in conjunction with a constant height inner blade portion, such as is shown in FIGS. 1, 6, and 9, to maintain a high suction pressure, for example.

Each cross section of a flow channel taken at radial positions along the flow channel is coincident with an arc portion of a circle having a circumference determined by that radial position. Since the circumference of a circle increases in direct proportion to the radius ($2\pi r$), then the cross-sectional area of a channel between a pair of blades is maintained constant by decreasing the blade height in inverse proportion to radius. For example, in FIGS. 3A and 3B, the cross-sectional area of the channel at radius $r_1$ is proportional to $r_1$ times the height $h_1$. At a radius $r_2$, the cross-sectional area is proportional to $r_2$ times the height $h_2$. To maintain the cross-sectional area of the channel constant, $r_1$ times $h_1$ is set equal to $r_2$ times $h_2$. Solving for $h_2$ gives:

$$h_2=(r_1 \times h_1)/r_2.$$

Therefore, a tapered segment is included in the height profile of each fan blade in which blade height is substantially inversely proportional to radius from the central axis of the fan.

A further improvement in noise performance is obtained by the addition of a bevel or chamfer 60 at the outermost edge of blade 46. Bevel 60 avoids sharp corners and helps to reduce any additional flow separation caused at the blade termination by the relatively high linear speed of outer end 57.

Figure 4:
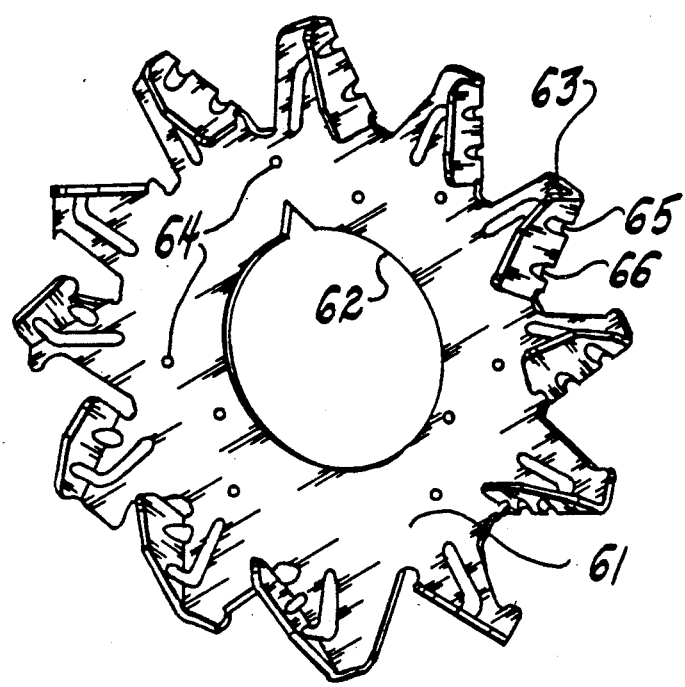
FIG. 4 is a perspective view of one embodiment of the fan of the invention.
Figure 5:
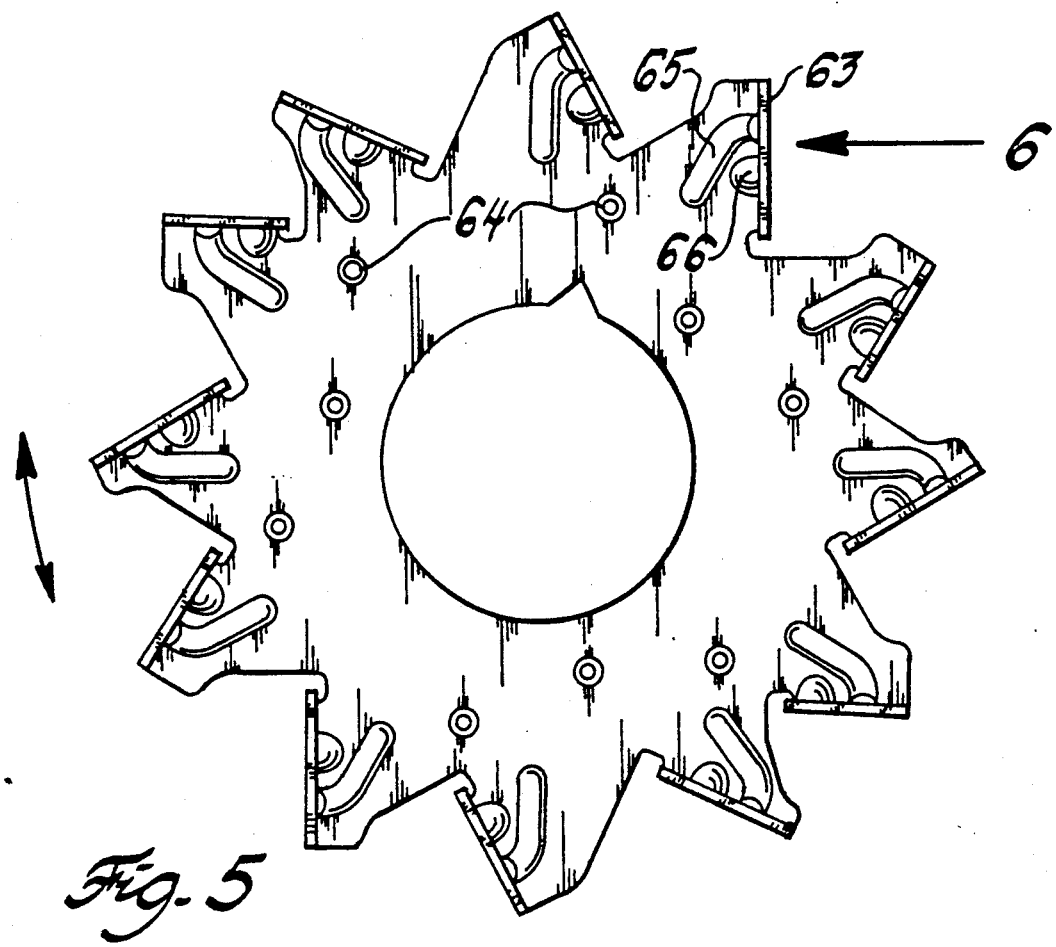
FIG. 5 is a top view of the fan of FIG. 4.

A preferred embodiment of front fan 31 (FIG. 1) is shown in FIGS. 4—6. A support plate 61 has an aperture 62 for receiving a shaft of the rotating machine. The fan is a one-piece metal stamping having a plurality of raised blades 63 each with reinforcing gussets 65 and 66. A plurality of dimples 64 are provided on support plate 61 in order to attach the fan to a rotor member by means of a projection weld.

As shown in FIG. 6, blade 63 has a height profile rising from support plate 61 which includes a constant height segment 70, a tapered segment 71, and a beveled segment 72. Tapered segment 71 is inclined toward segment 72 such that blade height decreases from the height of constant height segment 70 in proportion to increasing radial distance from the center of the fan, e.g., at a point where radial position is 10 percent greater than the radius at the intersection of segments 70 and 71, the blade height is decreased by 10 percent. Beveled segment 72 has an even greater incline.

Blades 63 are straight and thus define flow channels with straight sides. However, the inclined segments of the blades result in a channel volume between blades having a constant cross-sectional area, and a substantial reduction in noise generation is achieved.

A preferred embodiment of rear fan 32 (FIG. 1) is shown in FIGS. 7-9. A support plate 75 has an aperture 76 for receiving a shaft of the rotating machine. The fan is a one-piece metal stamping having a plurality of raised blades 77 each with a reinforcing gusset 79. A plurality of dimples 78 are provided on support plate 75 in order to attach the fan to a rotor member by means of a projection weld.

As shown in FIG. 9, blade 77 has a height profile rising from support plate 75 which includes a constant height segment 80, a tapered segment 81, an outer beveled segment 82, and an inner beveled segment 83. Tapered segment 81 is inclined toward plate 75 in the manner previously described. Beveled segment 82 has an even greater incline.

Blades 77 are curved and thus define flow channels with curved sides. However, the incline of the tapered segments provides a channel having a constant cross-sectional area. Inner bevel 83 further reduces noise by avoiding a sharp corner at the inner end of blade 77.

Alternators using the fan blade profiles of the present invention have been found to have decreased noise levels of up to 3 dBa (adjusted dB) over similar alternators with similar blades having substantially rectangular blade height profiles. Blade shapes have been investigated having a constant height inner segment comprising of from about 43 to 50 percent of the total radial extent of the blade and having a tapered portion comprising from about 50 to 57 percent of the radial blade extent. This range provides the best trade-off between reducing noise sound pressure and maintaining thermal performance (i.e., adequate air flow). Bevels at either end of the blade can preferably be provided which may include about 5 to 10 percent of the blade radial extent.

The fans of the invention maintained their effectiveness in providing reduced noise levels and a large cooling air flow over a large speed range, e.g., 0 to 23,000 rpm. They are further capable of being manufactured by inexpensive fabrication techniques such as by metal stamping.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A fan-cooled rotating electrical machinery comprising:
   a rotatable shaft;
   a rotor connected to said shaft;
   a ventilated housing receiving said shaft and said rotor;
   a stator received by said housing; and
   a fan coupled to said shaft within said housing and having a central axis aligned with said shaft, said fan including a supporting plate and a plurality of blades supported by said supporting plate, each blade extending radially from said central axis and substantially normally from said supporting plate, a plurality of flow channels being defined exclusively by said supporting plate and adjacent blades, said flow channels discharging within said housing, at least a portion of said blades having a height profile which is a function of radial distance from said central axis, said height profile including a tapered segment in which said height profile includes a predetermined height $h_1$ at a radius $r_1$ and includes a height $h_2$ at another radius $r_2$ which is substantially determined by the formula:

$$h_2=(r_1 \times h_1)/r_2.$$

2. The machinery of claim 1 wherein said height profile further includes a beveled edge radially outward from said tapered segment.

3. The machinery of claim 1 wherein said height profile further includes a substantially constant height segment radially inward from said tapered segment.

4. A method for reducing noise generated by a variable-speed rotating centrifugal fan rotor within a housing of rotating electrical machinery, said method comprising the steps of:
   providing a plurality of fan blades inside said housing for defining a plurality of flow channels and for creating a pressure difference during rotation to cause a fluid flow discharged from said blades within said housing; and providing a tapered portion on each of said blades in which blade height decreases in proportion to increasing radial distance from a fan center in order to reduce the size of regions in said flow channels in which the derivative of pressure with respect to radius is positive and providing a constant height portion at the end of said blades nearest said fan center, said tapered portion comprising about 50 to 57% of radial blade length and said constant height portion comprising from about 43 to 50% of radial blade length.

5. The method of claim 4 further comprising the step of providing a beveled edge portion at one blade end comprising from about 5 to 7% of radial blade length.

6. The method of claim 4 further comprising the step of providing beveled edges at each blade end.

* * * * *